April 12, 1966   W. ROTH   3,245,652
VALVE
Filed Dec. 21, 1962   3 Sheets-Sheet 1
FIG. 1
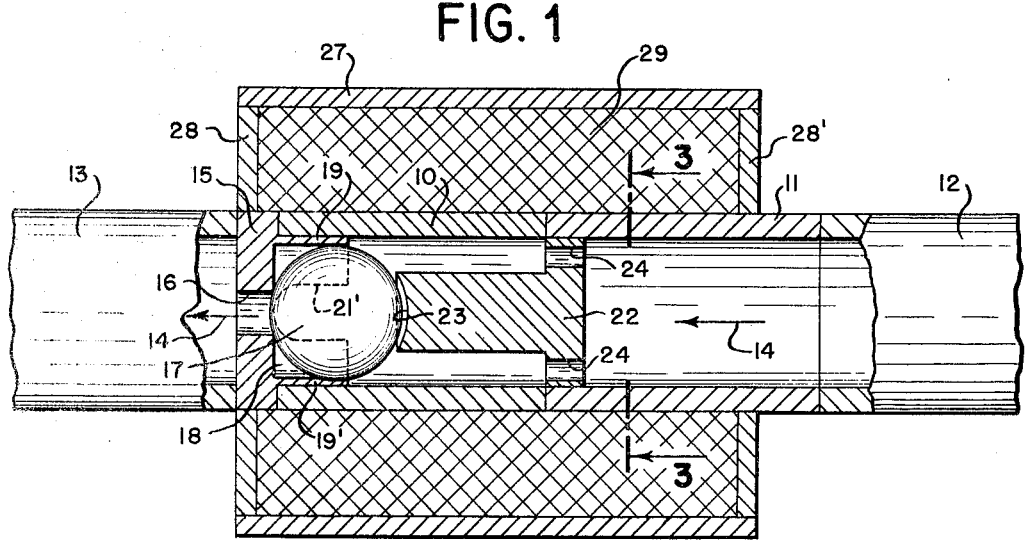
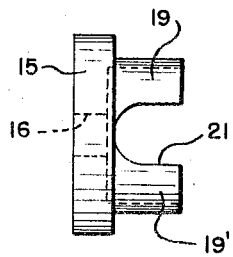
FIG. 2A
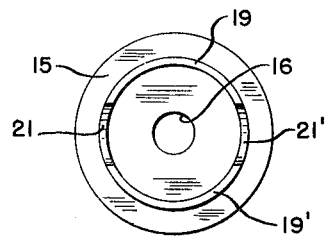
FIG. 2B
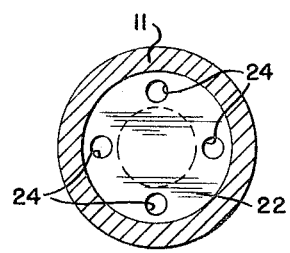
FIG. 3
INVENTOR
Wilfred Roth
BY
ATTORNEYS

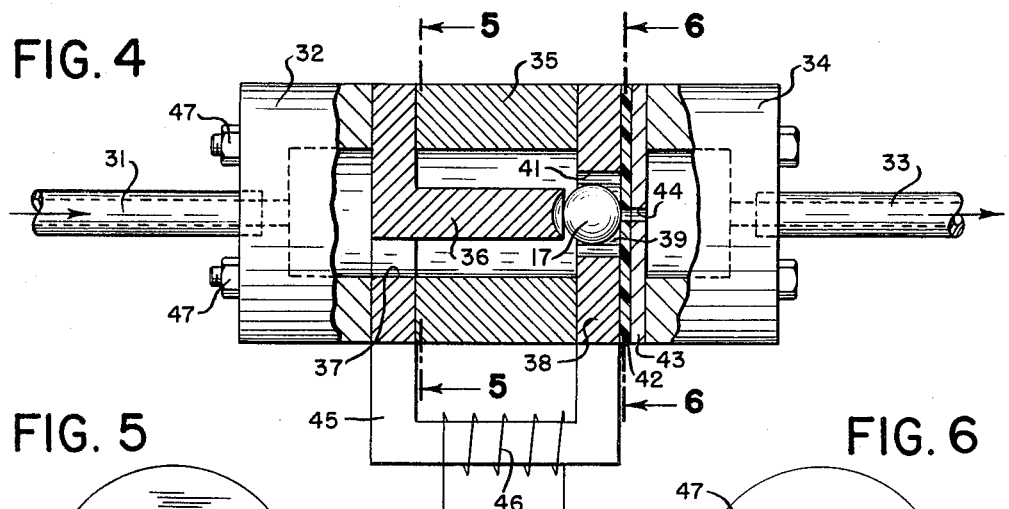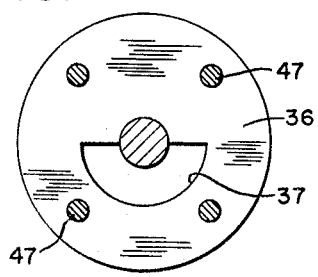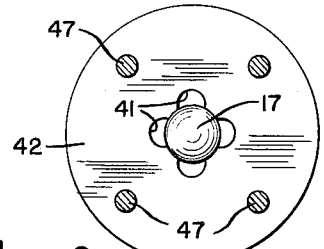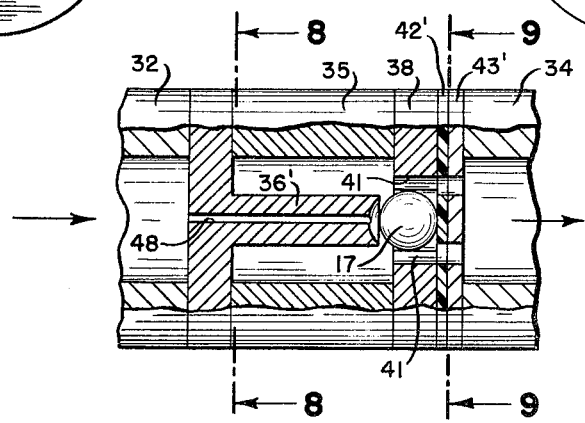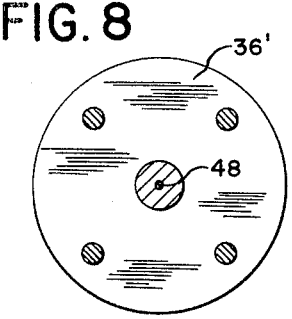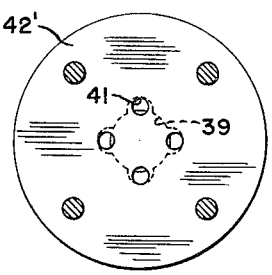

INVENTOR
Wilfred Roth
BY
ATTORNEYS

United States Patent Office 3,245,652
Patented Apr. 12, 1966

3,245,652
VALVE
Wilfred Roth, West Hartford, Conn., assignor to Gabb Special Products, Inc., Windsor Locks, Conn., a corporation of Connecticut
Filed Dec. 21, 1962, Ser. No. 246,509
6 Claims. (Cl. 251—139)

This invention relates to electromagnetically actuated ball valves.

Ball valves actuated electromagnetically are particularly useful for automatic and remote control of fluid flow systems. While numerous valves of this type have been designed, in general the magnetic circuits provided have been inefficient, and accordingly relatively large electromagnets and power supplies have been required for satisfactory operation.

The present invention is directed to the provision of a simple, efficient, electromagnetic ball valve which is capable of reliable operation for long periods of time.

In accordance with the invention, a free-floating ball of magnetic material is employed, and a magnetic circuit is provided having pole sections within the valve conduit section in proximity with the ball. A coil is associated with the magnetic circuit, and upon energization thereof moves the ball toward or away from an orifice to close or open the valve as the case may be. The pole sections are arranged so that there is a close spacing between the ball and one pole in both positions of the ball, and a relatively larger spacing between the ball and the other pole when the coil is unenergized. Then, when the coil is energized, the ball moves toward the other pole, preferably until it is in contact therewith, while remaining closely adjacent the first pole. In this manner positive and reliable actuation is obtained while at the same time providing an efficient magnetic circuit. Also, since the ball is free-floating, wear thereof tends to be equalized and thus promotes long life.

This invention is described below in connection with specific embodiments shown in the drawings, in which:

FIG. 1 is a cut-away view of one embodiment of the invention;

FIGS. 2A and 2B show side and front views of the valve seat member of FIG. 1;

FIG. 3 is a partial cross-section along the line 3—3 in FIG. 1;

FIG. 4 is a cut-away view of another embodiment of the invention;

FIG. 5 is a section along line 5—5 in FIG. 4, with the electromagnet removed;

FIG. 6 is a section along line 6—6 in FIG. 4;

FIG. 7 shows a modification of the valve of FIG. 4 adapted for normally-open operation;

Figure 10A:
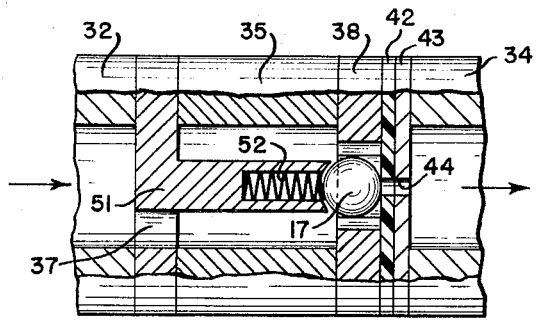
Figure 10B:
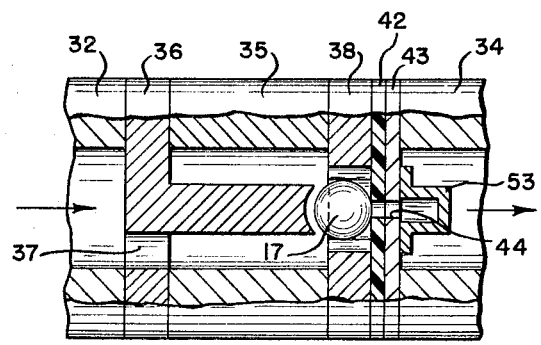
Figure 11:
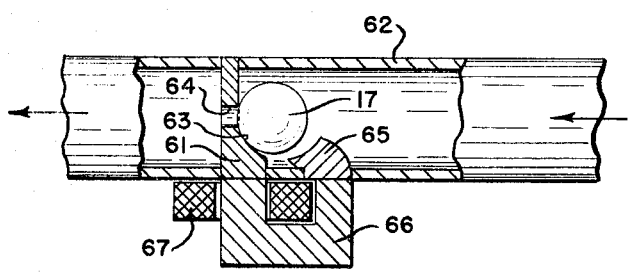
Figure 12:
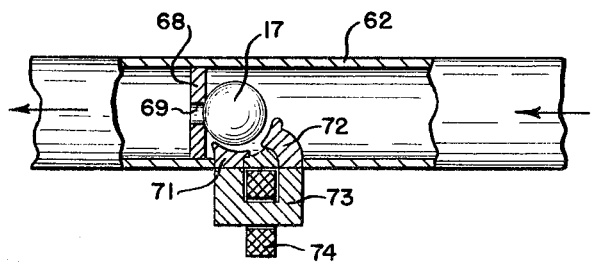

FIGS. 8 and 9 are sections along lines 8—8 and 9—9 in FIG. 7, respectively;

FIGS. 10A and 10B show modifications of the valve of FIG. 4 including means for biasing the valves to the closed position; and FIGS. 11 and 12 show cut-away views of additional embodiments of the invention.

Referring to FIGS. 1–3, a valve is shown having a conduit section formed by cylindrical members 10 and 11, with inlet and outlet conduits 12 and 13 connected thereto for fluid flow in the direction indicated by arrows 14. At the outlet end of the conduit section is a transverse valve seat member 15 having an orifice 16 therethrough on which ball 17 is seatable to control fluid flow through the conduit section. The valve seat member 15 is of magnetic material such as steel, and forms one pole member. It has a socket 18 therein in which ball 17 is movable between seated and unseated positions. The socket has wall portions 19, 19' which are closely adjacent the periphery of the ball. The wall has breaks therein formed by cut-outs 21, 21' so that fluid can flow around the ball in the unseated position thereof.

A second pole member 22 of magnetic material is mounted in the conduit section and extends toward the socket 18 of the valve seat member. The end 23 thereof is concave and in proximity to ball 17, but is spaced therefrom in the seated position shown so as to allow the ball to move to the right to its unseated position, thereby opening the orifice 16 and allowing fluid to flow. The pole member 22 has apertures 24 therein to allow fluid to flow thereby. Member 10 of the conduit section is of non-magnetic material such as brass or aluminum, whereas member 11 is of magnetic material. The various members 11 are of magnetic material. The various members may be held together in any desired manner.

The pole members 15 and 22 are connected externally by a structure of magnetic material to form a magnetic circuit with the pole members and the ball 17. In this embodiment the external structure comprises a cylindrical section 27 and end plates 28, 28' of magnetic material. A coaxial coil 29 is provided to produce flux in the magnetic circuit when energized.

In operation, with the coil unenergized, the ball 17 is held in its seated position by the inlet fluid pressure, and prevents fluid flow. Or, the valve can be mounted vertically so that gravity pulls the ball against its seat. When the coil 29 is energized, the ball is moved to the right against end 23 of the pole piece, thereby unseating the ball and allowing fluid flow through the orifice 16.

It will be noted that the spacing between the ball 17 and the walls 19, 19' of the socket 18 is very small both in seated and unseated positions, so that there is only a small gap, if any, in the magnetic circuit under either condition. Also, the connection of the pole members externally by a structure of magnetic material provides a path of low reluctance. Accordingly, when the valve is seated and the coil 29 energized, there is a strong magnetic field in the gap between ball 17 and the front end 23 of pole piece 22 acting to unseat the ball. As the ball moves to the right, it contacts pole end 23, thus assuring a strong magnetic field to maintain the ball unseated and the valve open. Preferably, socket 18 is deep enough so that the ball remains within the socket to at least the center thereof in seated and unseated positions, as shown, so that there is close spacing between the periphery of the ball and the socket wall in both positions.

It will therefore be apparent that an efficient magnetic circuit is provided for moving the ball. Also, since the ball is free-floating, wear thereof is equalized so that reliable operation can be obtained over a considerable period of time.

FIGS. 4–6 show a modification of the valve of FIGS. 1–3, arranged for more convenient manufacture. It also includes features that could be incorporated in the embodiment of FIGS. 1–3 if desired. An inlet conduit 31 is connected to an inlet housing 32 of the valve, and an outlet conduit 33 is connected to an outlet housing 34. The inlet and outlet housings may be of non-magnetic material, such as aluminum. The intermediate cylindrical member 35 is of non-magnetic material. Pole member 36 is similar to pole member 22 of FIG. 1, but has a single semi-circular passage 37 for fluid flow, instead of a plurality of holes.

In this embodiment the transverse pole member, including a socket with an orifice at the bottom thereof against which the ball 17 is seatable, is a composite member in which the ball seats against a plastic material instead of metal. To this end, the composite member includes a disc 38 of magnetic material with a socket 39 therein for receiving the ball 17. Breaks 41 formed by grooves in the wall of the socket allow fluid to flow by the ball in its unseated position. A thin disc 42 of a suitable plastic such as polyethylene and a supporting disc 43 of non-magnetic material have an orifice 44 therethrough.

Instead of using a coaxial coil and external structure of magnetic material as in FIG. 1, in FIG. 4 a U-shaped core 45 of magnetic material connects the pole members 36 and 38. The legs of core 45 may have semi-circular shaped ends so as to intimately contact the pole members throughout the desired area to provide a low reluctance path. Coil 46 is wound around core 45.

The assemblage is held together by bolts 47 passing therethrough, the core member 45 being held in place in any desired manner.

The operation of the valve of FIG. 4 is similar to that of FIG. 1 and need not be described again.

FIGS. 7–9 show a valve structure similar to that of FIGS. 4–6, except that it is arranged to be normally open rather than normally closed. Pole member 36' is similar to 36 of FIG. 4, except that the semicircular hole 37 is omitted and a coaxial orifice 48 extends therethrough. The ball 17 seats on the end of pole member 36' when the magnetic circuit is energized, thereby closing orifice 48 and preventing fluid flow. Instead of an orifice 44 in the discs 42' and 43', grooves 41 are continued therethrough.

FIGS. 10A and 10B show valve structures similar to that of FIG. 4, but including means for biasing the ball 17 to its seated position. In this manner no reliance need be placed upon pressure of fluid in the inlet line, or on the force of gravity, to close the valve.

In the embodiment of FIG. 10A the pole member 51 is like member 36 in FIG. 4 except that a compression spring 52 is inserted in the end thereof and bears against the ball to hold it in its seated position against orifice 44.

In FIG. 10B a permanent U-shaped magnet 53 is mounted on plate 43 and provides a magnetic bias to hold the ball 17 in its seated position. The sides of the U-shaped magnet are open so as to allow fluid passing through the orifice 44 in the unseated position of the ball to pass by the magnet.

Referring now to FIG. 11, an embodiment is shown in which the ball is arranged to roll on one of the pole pieces in moving from seated to unseated positions. Here the transverse valve seat member 61 of magnetic material is mounted in conduit section 62 of non-magnetic material, and has a curved surface 63 on which ball 17 may roll. Orifice 64 is provided against which the ball 17 normally seats. A second pole member 65 is also mounted in the conduit section 62. The poles are connected externally of the conduit section by a U-shaped structure 66 of magnetic material. Coil 67 is wound around one leg of structure 66 and, when energized, causes ball 17 to roll on surface 63 until it contacts the concave end of the pole member 65. The external structure 66 could be integral with the pole members 61 and 65, but it is usually more convenient to manufacture it as a separate structure and attach it to the pole members in a suitable manner.

FIG. 12 shows an embodiment similar to FIG. 11 but modified so as to separate the magnetic members from the valve seat member. Here a transverse valve seat member 68 is of any desired material and is mounted in conduit section 62 in any desired manner. An orifice 69 is provided against which ball 17 normally seats. Pole members 71 and 72 are mounted in the conduit section 62 and have curved surfaces conforming to the surface of ball 17. Pole member 71 is closely adjacent ball 17 but there is advantageously a very slight spacing between the pole member and the ball when the ball is in its seated position as shown, so as not to interfere with proper seating of the ball. An external magnetic structure 73 connects the pole members and a coil 74 is wound therearound. When the coil is energized the ball 17 rolls over the curved face of pole member 71 until it reaches pole member 72.

It will be noted that in all the embodiments shown the ball 17 is closely adjacent or in contact with one pole member in both seated and unseated positions. The other pole member is in proximity to the ball, but spaced therefrom a sufficient distance to allow the ball to move between seated and unseated positions. When the magnetic circuit is energized, the ball is drawn toward the second pole member and preferably contacts it so as to establish a strong magnetic field to hold the ball thereagainst. Thus the magnetic circuit is very efficient and reliable operation can be obtained while allowing relatively small coils and small amounts of power to be employed.

The invention has been described in connection with several specific embodiments thereof. It will be understood that many detailed modifications are possible within the spirit and scope of the invention.

I claim:

1. An electromagnetic ball valve which comprises
  (a) a conduit section,
  (b) a valve seat in the conduit section having an orifice therethrough and a ball seatable thereon for controlling fluid flow through the conduit section,
  (c) said ball being of magnetic material and movable between seated and unseated positions and being positioned for fluid flow around the ball on opposite sides thereof in the unseated position thereof,
  (d) a magnetic circuit of magnetic material having a pair of poles in the path of fluid flow in the conduit section and adjacent the ball and arranged for the passage through the ball of magnetic flux between the poles having a substantial component generally parallel to the fluid flow to move the ball from one of said positions to the other,
  (e) said poles being designed and adapted for providing a close spacing between the ball and one pole in both positions of the ball, a relatively larger spacing between the other pole and the ball in said one position thereof, and contact of said other pole by the ball in said other position thereof,
  (f) and a coil for producing flux in said magnetic circuit.

2. An electromagnetic ball valve which comprises
  (a) a conduit section,
  (b) a valve seat in the conduit section having an orifice therethrough and a ball seatable thereon for controlling fluid flow through the conduit section,
  (c) said ball being of magnetic material and movable between seated and unseated positions and being positioned for fluid flow around the ball on opposite sides thereof in the unseated position thereof,
  (d) a magnetic circuit of magnetic material having a pair of poles in the path of fluid flow in the conduit section and adjacent the ball and arranged for the passage through the ball of magnetic flux between the poles having a substantial component generally parallel to the fluid flow to move the ball from one of said positions to the other,
  (e) said poles being designed and adapted for providing a close spacing between the ball and one pole in both positions of the ball and a relatively larger spacing between the other pole and the ball in said one position thereof,
  (f) said one pole having a socket therein adjacent the valve seat in which the ball moves,
  (g) the depth of said socket being predetermined so that the ball remains within the socket to at least substantially the center thereof in seated and unseated positions,
  (h) and a coil for producing flux in said magnetic circuit.

3. An electromagnetic ball valve which comprises
  (a) a conduit section, (b) a transverse pole member of magnetic material extending across said conduit section and having a socket therein,
(c) a second pole member of magnetic material mounted in the path of fluid flow in said conduit section and extending toward the socket of the transverse pole member,
(d) a ball of magnetic material positioned in said socket and movable toward and away from said second pole member,
(e) an orifice in one of said pole members against which the ball seats in one position thereof for controlling fluid flow through the conduit section,
(f) said ball being positioned for fluid flow therearound on opposite sides thereof in the unseated position thereof,
(g) means for allowing fluid flow past the other of said pole members,
(h) a structure of magnetic material connecting said pole members externally of the conduit section to form a magnetic circuit with the pole members and the ball in which a substantial component of flux therein is generally parallel to the fluid flow,
(i) and a coil for producing flux in said magnetic circuit to move the ball from one of the seated and unseated positions thereof to the other.

4. Apparatus in accordance with claim 3 in which the depth of said socket is predetermined so that the ball remains within the socket to at least substantially the center thereof in seated and unseated positions.

5. An electromagnetic ball valve which comprises
(a) a conduit section,
(b) a transverse pole member of magnetic material extending across said conduit section and having a socket therein,
(c) a second pole member of magnetic material mounted in the path of fluid flow in said conduit section and extending toward the socket of the transverse pole member,
(d) a ball of magnetic material positioned in said socket and movable toward and away from said second pole member,
(e) an orifice at the bottom of said socket against which the ball is seatable and unseatable to control fluid flow through the conduit section,
(f) said socket having wall portions closely adjacent the periphery of the ball in seated and unseated positions thereof and breaks in the wall thereof on opposite sides of the ball allowing fluid flow around the ball in the unseated position thereof,
(g) means for allowing fluid flow past the second pole member,
(h) a structure of magnetic material connecting said pole members externally of the conduit section to form a magnetic circuit with the pole members and the ball in which a substantial component of flux therein is generally parallel to the fluid flow,
(i) and a coil for producing flux in said magnetic circuit to move the ball to the unseated position thereof.

6. Apparatus in accordance with claim 5 including means for biasing said ball to the seated position thereof.

References Cited by the Examiner

UNITED STATES PATENTS

| 2,056,322 | 10/1936 | Hoppe | 251—141 |
| 2,391,017 | 12/1945 | Grontkowski | 251—141 |

FOREIGN PATENTS

| 876,454 | 8/1942 | France. |
| 220,043 | 3/1910 | Germany. |
| 323,738 | 8/1920 | Germany. |

M. CARY NELSON, *Primary Examiner.*